No. 663,968. Patented Dec. 18, 1900.
J. W. JOHNSON.
BICYCLE BRAKE.
(Application filed July 29, 1898.)
(No Model.)
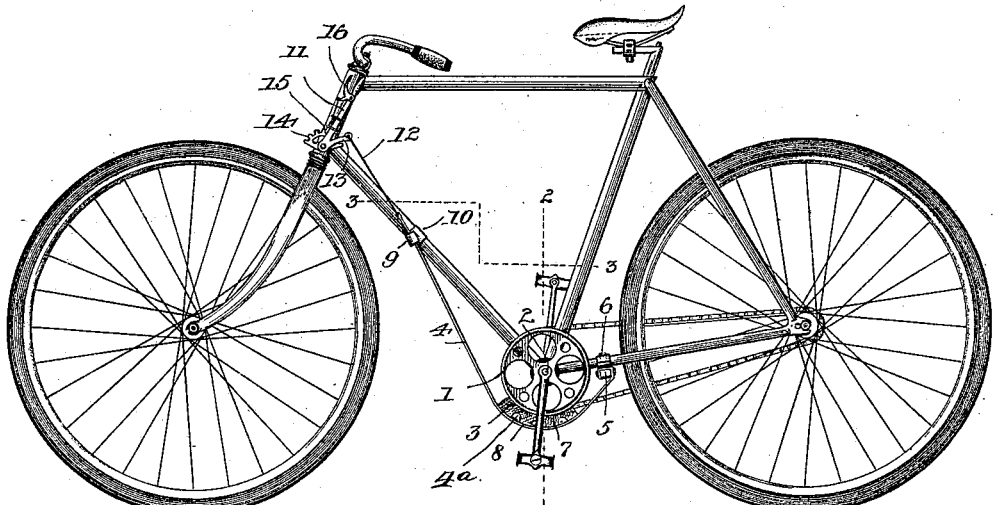
Fig. 1.
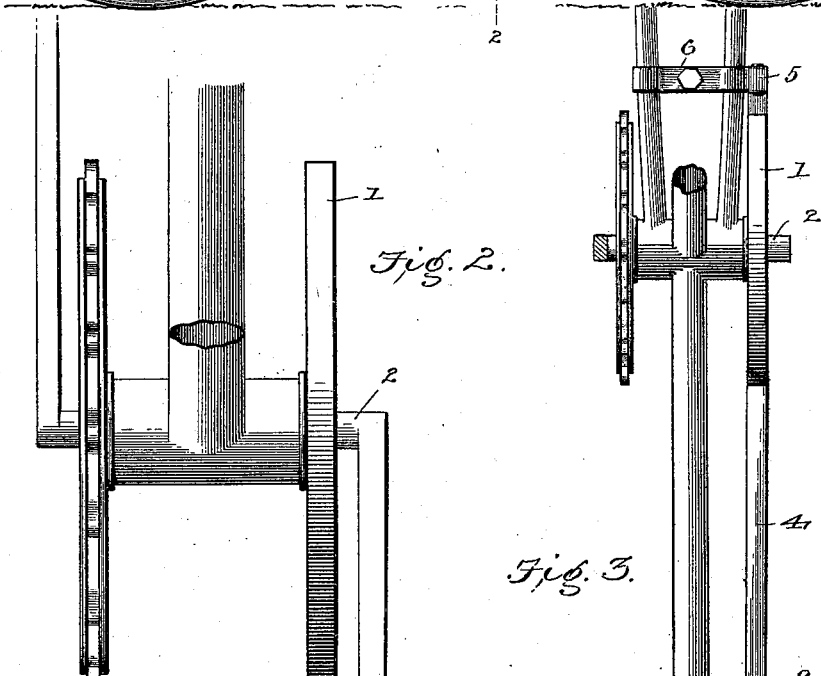
Fig. 2.
Fig. 3.
Witnesses
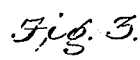
By his Attorneys,
John W. Johnson.
Inventor

United States Patent Office.

JOHN WALLACE JOHNSON, OF TRENTON, MISSOURI.

BICYCLE-BRAKE.

SPECIFICATION forming part of Letters Patent No. 663,968, dated December 18, 1900.

Application filed July 29, 1898. Serial No. 687,230. (No model.)

*To all whom it may concern:*

Be it known that I, JOHN WALLACE JOHNSON, a citizen of the United States, residing at Trenton, in the county of Grundy and State of Missouri, have invented a new and useful Bicycle-Brake, of which the following is a specification.

My invention relates to vehicle-brakes, and particularly to a brake designed for application to a bicycle or similar machine; and the object in view is to provide a device adapted to efficiently perform the functions of a brake which may be applied with facility to any of the ordinary forms of machines now in use.

Further objects and advantages of this invention will appear in the following description and the novel features thereof will be particularly pointed out in the appended claim.

In the drawings, Figure 1 is a view of a brake mechanism constructed in accordance with my invention applied in the operative position to a bicycle. Fig. 2 is a vertical transverse section of the same on the line 2 2 of Fig. 1. Fig. 3 is a horizontal section on the line 3 3 of Fig. 1.

Similar numerals of reference indicate corresponding parts in all the figures of the drawings.

The apparatus embodying my invention consists, essentially, of a brake pulley or wheel 1, fixed to the crank-axle 2, a brake-shoe 3, supported by a flexible brake-strap 4, and means for applying strain to the brake-strap to cause the desired pressure of the brake-shoe against the periphery of the brake-pulley. In the construction illustrated the attachment of the rear end of the brake-strap 4 to the frame of the machine is accomplished by means of a bracket 5, having a double clamp 6 for engagement with the rear braces of the frame, said rear end of the brake-strap being riveted, bolted, or otherwise securely fastened to the bracket which projects laterally beyond that side of the frame at which the brake-pulley is located, it being obvious that the brake-pulley is arranged at the opposite side from the chain or other driving mechanism which may form a part of the bicycle. This disposition of the parts arranges the brake-strap 4 in the plane of the brake-pulley, and the brake-shoe, which consists of a cushion 7, of rubber or equivalent yielding and frictional material, and a cushion-seat 8, in which the cushion is securely fastened, is held by the brake-strap in such a position that the application of tensile strain to the strap brings the surface of the cushion into contact with the periphery of the brake-pulley. The brake-strap consists, preferably, of a ribbon of steel or similar spring metal having a normal curvature which is adapted to hold the brake-shoe out of contact with the periphery of the pulley, whereby when tensile strain upon said ribbon is relieved the brake-shoe will be withdrawn automatically to release the driving mechanism of the machine; but in order that tensile strain may be applied with facility to the ribbon I preferably extend the portion thereof in front of the pulley through a guide 9, forming a part of a bracket which is secured to the front brace of the machine by a clamp 10.

The resilient strap 4 is provided at intervals beneath the brake-wheel with upwardly-extending inwardly-inclined approximately segmental lips $4^a$, located at the opposite edges of the strap and embedded in the side faces of the shoe and retaining the latter to the strap. Both the shoe and the strap are flexed when the brake is applied to cause the shoe to fit against the brake-wheel, and when the strap is relieved of strain it springs away from the brake-wheel by straightening slightly and resuming its normal position, and it carries with it the flexible brake-shoe. By locating the lips at intervals at opposite sides of the strap the latter is permitted to flex at the points between the lips, and the latter do not interfere with the curving of the strap and the brake-shoe, and they grip the latter and cause the brake-shoe to swing out of engagement with the brake-wheel when the strap straightens by reason of the strain or tension being removed.

The means illustrated in the drawings for applying tension to the strap 4 consist of a brake-lever 11, fulcrumed upon the frame of the bicycle at a point within convenient reach of the rider, as adjacent to or upon the head, and a link or rod 12, connecting an arm 13 of the said lever with the front extremity of the strap 4. The arm 13 preferably extends upwardly from the pivot-point of the lever, whereby the forward movement of the lever causes the straining of the strap through the link or rod 12, and in order that the brake-lever may be secured at the desired adjustment I employ a toothed segment 14, with which engages a pawl 15, spring-actuated to hold it normally in engagement with the teeth of the segment and connected with a trip-lever 16, mounted upon the brake-lever. Therefore in order to provide a bicycle with a brake mechanism constructed in accordance with my invention it is necessary simply to apply the brake-pulley to the crank-axle and engage the above-described clamps with the frame respectively in front and in rear of the pulley to dispose the ribbon 4 in the plane of the brake-pulley. The application of tension to the ribbon by means of the brake-lever will elevate the brake-shoe sufficiently to bring it into frictional contact with the brake-pulley, and thereby impede the forward movement of the vehicle to a greater or less extent, as may be desired by the rider.

A further feature of the construction disclosed resides in the attachment of the rear end of the ribbon or brake-strap at a point in rear of the brake-pulley and thence extending under the pulley, where it is provided with the brake-shoe, and through a guide located upon the frame in front of the pulley, whereby the point of attachment of the strap and the guide through which the front portion thereof extends are located upon opposite sides of the brake-pulley and above the horizontal plane of the axis thereof, the brake-pulley being arranged in an offset or curved portion of the strap. Hence when the strap is strained the brake-shoe presses upwardly against the under side of the brake-pulley instead of throughout the periphery thereof, and therefore I am enabled to use a brake-shoe which is replaceable when worn to protect the brake-strap from wear. The arrangement of the brake-shoe below the brake-pulley for upward movement to come in contact with the periphery of said pulley possesses the further advantage that when the brake-strap is relieved of strain said brake-shoe is adapted to fall away from the brake-pulley by gravity, and thus avoid complicating means for relieving the brake-pulley of the frictional contact of the brake-shoe.

Various changes in the form, proportion, and the minor details of construction may be resorted to without departing from the spirit or sacrificing any of the advantages of this invention.

Having described my invention, what I claim is—

In a device of the class described, the combination with a bicycle, of a brake-wheel 1 secured to the crank-axle 2 on an extension thereof and at the side opposite that bearing the driving-chain wheel, the rear bracket 5 provided with the double clamp 6 and secured to and extending across the rear braces of the bicycle-frame at a point between the rear wheel and the brake-wheel and extending outward at the side at which the brake-wheel is located, the front guide 9 mounted on the front brace of the bicycle-frame and extending therefrom and having an opening arranged in line with the outer portion of the bracket 5, the brake-strap 4 secured at its rear end to the bracket 5 and passing beneath the brake-wheel and extending forward from the bottom of the same through the opening of the guide 9, the brake-shoe 7 arranged on the upper face of the strap 4 and located at the bottom of the brake-wheel and adapted to drop by gravity out of engagement with the same when the strap is slackened, the upwardly-extending inwardly-inclined lips located at the side edges of the strap and arranged at intervals throughout the length of the brake-shoe and formed integral with the former and embedded in the side faces of the latter, said lips being adapted to secure the shoe to the strap without interfering with the flexing of either of the said parts, and a strap-tightening device comprising a ratchet and a lever having a pawl and provided with an arm arranged at an acute angle to the lever and connected with the front end of the strap, substantially as described.

In testimony that I claim the foregoing as my own I have hereto affixed my signature in the presence of two witnesses.

JOHN WALLACE JOHNSON.

Witnesses:
   H. J. HUGHES,
   B. H. EARLE.